US012148368B2

(12) United States Patent
Lu et al.

(10) Patent No.: US 12,148,368 B2
(45) Date of Patent: Nov. 19, 2024

(54) DISPLAY PANEL AND DISPLAY DEVICE

(71) Applicant: YUNGU (GU'AN) TECHNOLOGY CO., LTD., Hebei (CN)

(72) Inventors: Jianjun Lu, Langfang (CN); Cuili Gai, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 18/170,180

(22) Filed: Feb. 16, 2023

(65) Prior Publication Data

US 2023/0196993 A1 Jun. 22, 2023

Related U.S. Application Data

(63) Continuation of application No. PCT/CN2021/115583, filed on Aug. 31, 2021.

(30) Foreign Application Priority Data

Nov. 27, 2020 (CN) ......................... 202011360409.6

(51) Int. Cl.
*G09G 3/3208* (2016.01)

(52) U.S. Cl.
CPC ... *G09G 3/3208* (2013.01); *G09G 2300/0819* (2013.01); *G09G 2310/0202* (2013.01);
(Continued)

(58) Field of Classification Search
CPC ......... G09G 3/3208; G09G 2300/0819; G09G 2310/0202; G09G 2310/0286; G09G 2320/0223; G09G 2320/0233
See application file for complete search history.

(56) References Cited

U.S. PATENT DOCUMENTS

2008/0284969 A1 11/2008 Lim
2014/0132526 A1 5/2014 Lee et al.
2016/0351151 A1 12/2016 Cao

FOREIGN PATENT DOCUMENTS

CN 1746966 A 3/2006
CN 102221760 A 10/2011
(Continued)

OTHER PUBLICATIONS

English translation of CN-107633812-A (Year: 2018).*
(Continued)

*Primary Examiner* — Lixi C Simpson
(74) *Attorney, Agent, or Firm* — Maier & Maier, PLLC

(57) ABSTRACT

A display panel and a display device. The display panel includes at least two controlled modules and a signal wire connected to the at least two controlled modules. The signal wire is configured to receive a drive signal sent by a drive module and transmit the drive signal to the at least two controlled modules. The signal wire includes a first path wire section and a second path wire section. A first end of the first path wire section and a first end of the second path wire section are configured to receive the same drive signal. The first path wire section is configured to sequentially transmit the drive signal to the at least two controlled modules in a first preset sequence. The second path wire section is configured to sequentially transmit the drive signal to the at least two controlled modules in a second preset sequence.

24 Claims, 13 Drawing Sheets

(52) U.S. Cl.
CPC ............... *G09G 2310/0286* (2013.01); *G09G 2320/0223* (2013.01); *G09G 2320/0233* (2013.01)

(56) References Cited

FOREIGN PATENT DOCUMENTS

| | | | | |
|---|---|---|---|---|
| CN | 203204992 | U | | 9/2013 |
| CN | 103745707 | A | | 4/2014 |
| CN | 103794181 | A | | 5/2014 |
| CN | 105139826 | A | | 12/2015 |
| CN | 105206232 | A | | 12/2015 |
| CN | 106652927 | A | | 5/2017 |
| CN | 107633812 | A | * | 1/2018 |
| CN | 207038050 | U | | 2/2018 |
| CN | 108010478 | A | | 5/2018 |
| CN | 109166520 | A | | 1/2019 |
| CN | 109961736 | A | | 7/2019 |
| CN | 110853511 | A | | 2/2020 |
| CN | 111129079 | U | | 5/2020 |
| CN | 210575035 | U | * | 5/2020 |
| CN | 111445831 | A | | 7/2020 |
| CN | 111883060 | A | | 11/2020 |
| CN | 112419977 | A | | 2/2021 |
| EP | 0895355 | A2 | | 2/1999 |
| IN | 209045059 | U | | 6/2019 |
| KR | 1019980079653 | A | | 11/1998 |
| KR | 1020190078780 | A | | 7/2019 |

OTHER PUBLICATIONS

English translation of CN-210575035-U (Year: 2020).*
International Search Report issued on Oct. 28, 2021, in corresponding International Application No. PCT/CN2021/115583, 5 pages.
Office Action issued on Jul. 5, 2021, in corresponding Chinese Application No. 202011360409.6, 14 pages.
Office Action issued on May 21, 2024, in corresponding Korean Application No. 10-2023-7011110, 16 pages.

* cited by examiner

DISPLAY PANEL AND DISPLAY DEVICE

CROSS-REFERENCE TO RELATED APPLICATIONS

This application is a continuation of International Patent Application No. PCT/CN2021/115583, filed on Aug. 31, 2021, which claims priority to Chinese Patent Application No. 202011360409.6 filed on Nov. 27, 2020, disclosures of both of which are incorporated herein by reference in their entireties.

TECHNICAL FIELD

Embodiments of the present application relate to the field of display technology, for example, a display panel and a display device.

BACKGROUND

With the continuous development of display technology, a display panel is more and more widely applied and consumers' requirements for a display panel are getting higher and higher. In particular, the image display quality of a display panel is always one of the important indicators for consumers and panel manufacturers to measure the quality of the display panel. However, a display panel may display unevenly. As a result, the improvement of the image display quality of the display panel is affected.

SUMMARY

Embodiments of the present application provide a display panel and a display device to alleviate the working condition of display unevenness and improve the image display quality.

An embodiment of the present application provides a display panel. The display panel includes at least two controlled modules and a signal wire connected to the at least two controlled modules.

The signal wire is configured to receive a drive signal sent by a drive module and transmit the drive signal to the at least two controlled modules.

The signal wire includes a first path wire section and a second path wire section. A first end of the first path wire section and a first end of the second path wire section are configured to receive the same drive signal.

The first path wire section is configured to sequentially transmit the drive signal to the at least two controlled modules in a first preset sequence. The second path wire section is configured to sequentially transmit the drive signal to the at least two controlled modules in a second preset sequence. The first preset sequence and the second preset sequence are different.

The present application also provides a display device. The device includes the display panel according to any embodiment of the present application.

In the embodiments of the present application, the signal wire connecting the controlled modules and the drive module includes a first path wire section and a second path wire section. The first path wire section sequentially transmits the drive signal to the at least two controlled modules in the first preset sequence. The second path wire section sequentially transmits the same drive signal as the drive signal in the first preset sequence to the at least two controlled modules in the second preset sequence. The first preset sequence and the second preset sequence are different. In the embodiments of the present application, the second path wire section is configured to reduce the RC delay of the drive signal received by a remote controlled module. In this manner, the characteristic difference such as rise time (Tr) and the fall time (Tf) of the drive signal received by the remote controlled module and a proximal controlled module is reduced. Moreover, the difference in the charging time of a pixel circuit is reduced, and the display uniformity is improved.

DETAILED DESCRIPTION

Figure 1:
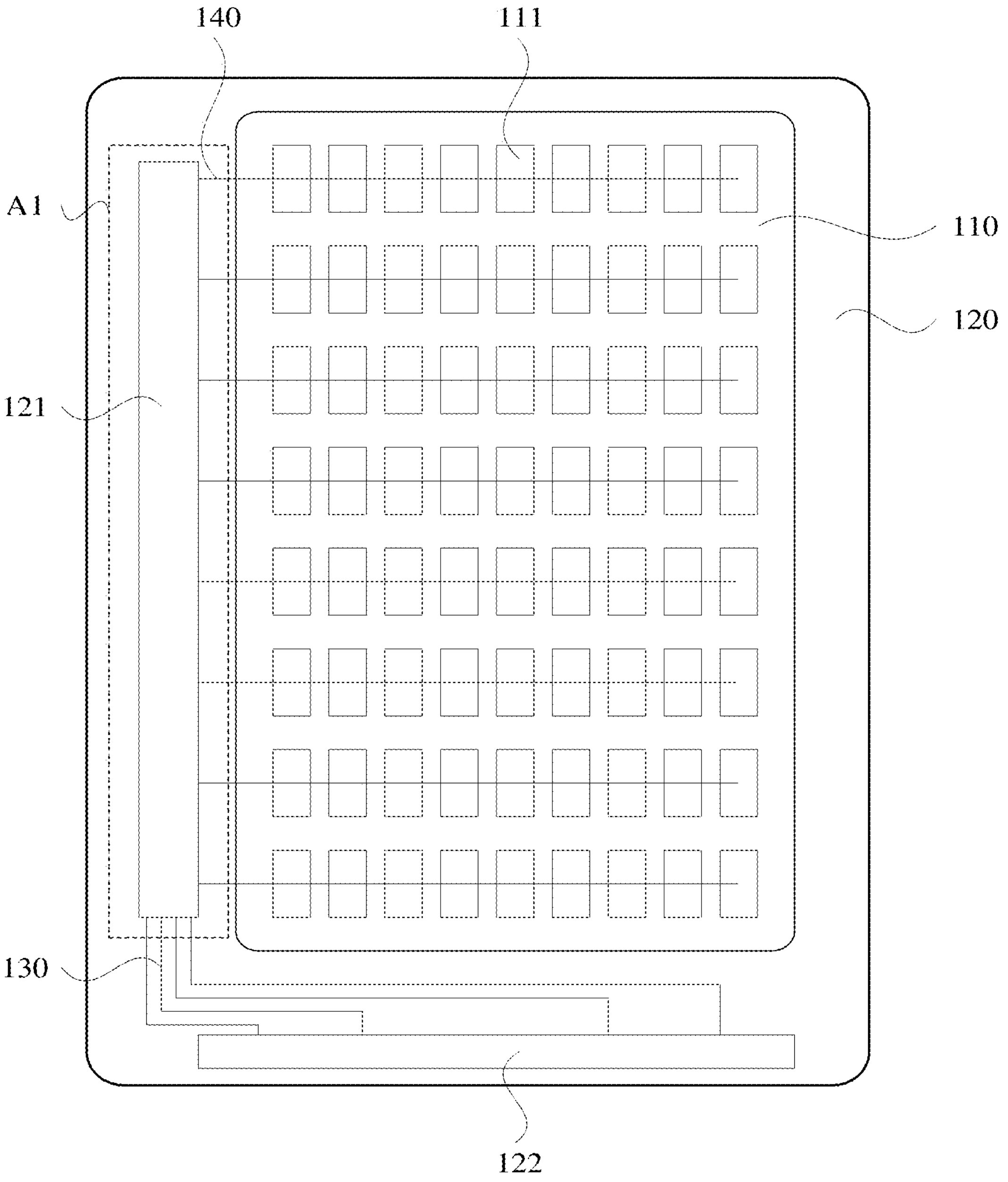
FIG. 1 (prior art)
FIG. 1 is a diagram illustrating the structure of a display panel in the related art.

The present application is further described in detail in conjunction with the drawings and embodiments. It is to be understood that the embodiments set forth below are merely intended to illustrate and not to limit the present application. Additionally, it is to be noted that for ease of description, only part, not all, of structures related to the present application are illustrated in the drawings.

The display panel in the related art may display unevenly. The applicant finds through research that the reason for uneven display lies in that there is an RC delay (RC loading) in the transmission process of a signal line. The analysis is below.

Figure 2:
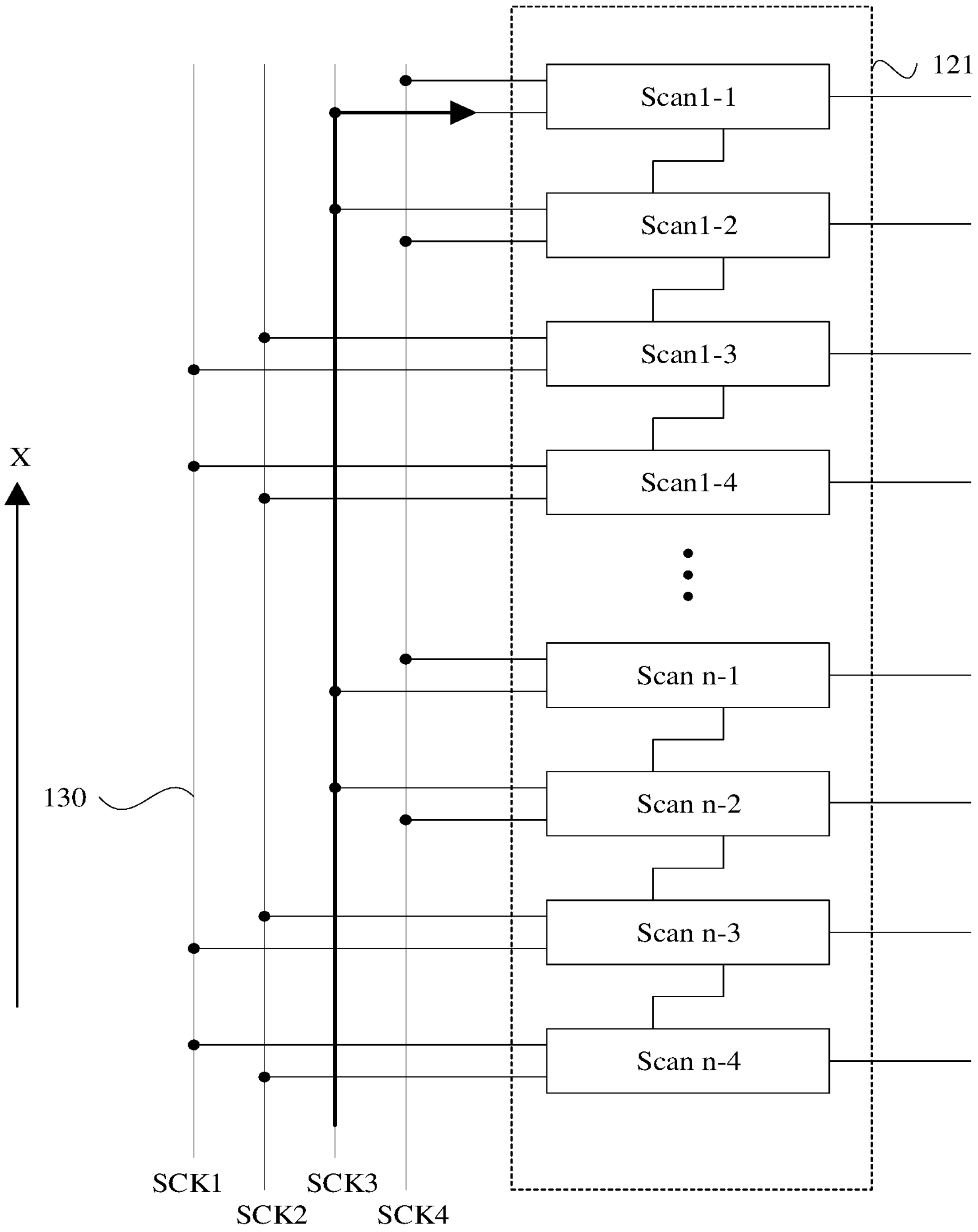
FIG. 2 is a view illustrating the structure of region A1 in the display panel of FIG. 1.

FIG. 1 is a diagram illustrating the structure of a display panel in the related art. FIG. 2 is a view illustrating the structure of region A1 in the display panel of FIG. 1. Referring to FIGS. 1 and 2, the display panel includes a display region 110 and a non-display region 120. The display region 110 is provided with pixel units 111 arranged in an array. A pixel unit 111 includes a pixel circuit and a light-emitting element. Cascaded shift registers are disposed in the non-display region 120. A circuit composed of the shift registers is referred to as a gate in panel (GIP) circuit 121. The GIP circuit 121 is electrically connected to a drive integrated circuit (IC) 122 through a signal wire 130. The GIP circuit 121 is electrically connected to the pixel units 111 through a signal wire 140.

For example, the display panel is an organic light-emitting diode (OLED) display panel based on low-temperature polycrystalline silicon (LTPS). The display process of the OLED display panel is the process of scanning the pixel units 111 row by row with the signal output by the GIP circuit 121. The signal output by the GIP circuit 121 is actually a replicated clock signal. There are many types of GIP circuit 121. The GIP circuit 121 may be, according to the type of an output signal, divided into a scan circuit outputting a scan signal, an emitting (EM) circuit outputting an EM signal, and a GIP circuit capable of outputting both a scan signal and an EM signal.

A description is given with reference to FIG. 2 by using an example in which the GIP circuit 121 is a scan circuit. The GIP circuit 121 includes multiple shift registers. Every four shift registers is a group. There are n groups. In the X direction, that is, in the direction from the side where the drive IC 122 of the display panel is located to the side of the display panel opposite to the drive IC 122, the GIP circuit 121 is sequentially arranged with shift register Scan n-4, shift register Scan n-3, shift register Scan n-2, shift register Scan n-1, . . . , shift register Scan 1-4, shift register Scan 1-3, shift register Scan 1-2, and shift register Scan 1-1. n denotes a positive integer. That is, shift register group Scan n is adjacent to the side where the drive IC 122 is located. Shift register group Scan 1 is adjacent to the side opposite to the drive IC 122. The clock signal includes a first clock signal SCK1, a second clock signal SCK2, a third clock signal SCK3, and a fourth clock signal SCK4.

The X direction may be recorded as a first direction.

The clock signal is transmitted in the X direction from the side where the drive IC 122 is located. However, since the clock signal is affected by the load of each shift register during transmission. The RC delay of the shift register located on the side opposite to the drive IC 122 is greater than the RC delay of the shift register located on the side where the drive IC 122 is located. For this reason, the rise time (Tr) and the fall time (Tf) of the signal output by the shift register on the side where the drive IC 122 is located are quite different from the rise time (Tr) and the fall time (Tf) of the signal output by the shift register on the side opposite to the drive IC 122. For example, the Tr/Tf of the signal output by shift register Scan n-2 is quite different from the Tr/Tf of the signal output by shift register Scan 1-1. The display effect of the pixel unit provided with a signal by shift register Scan n-2 is quite different from the display effect of the pixel unit provided with a signal by shift register Scan 1-1, thereby affecting the display uniformity of the display panel.

In view of this case, an embodiment of the present application provides a display panel that can alleviate this case.

Figure 3:
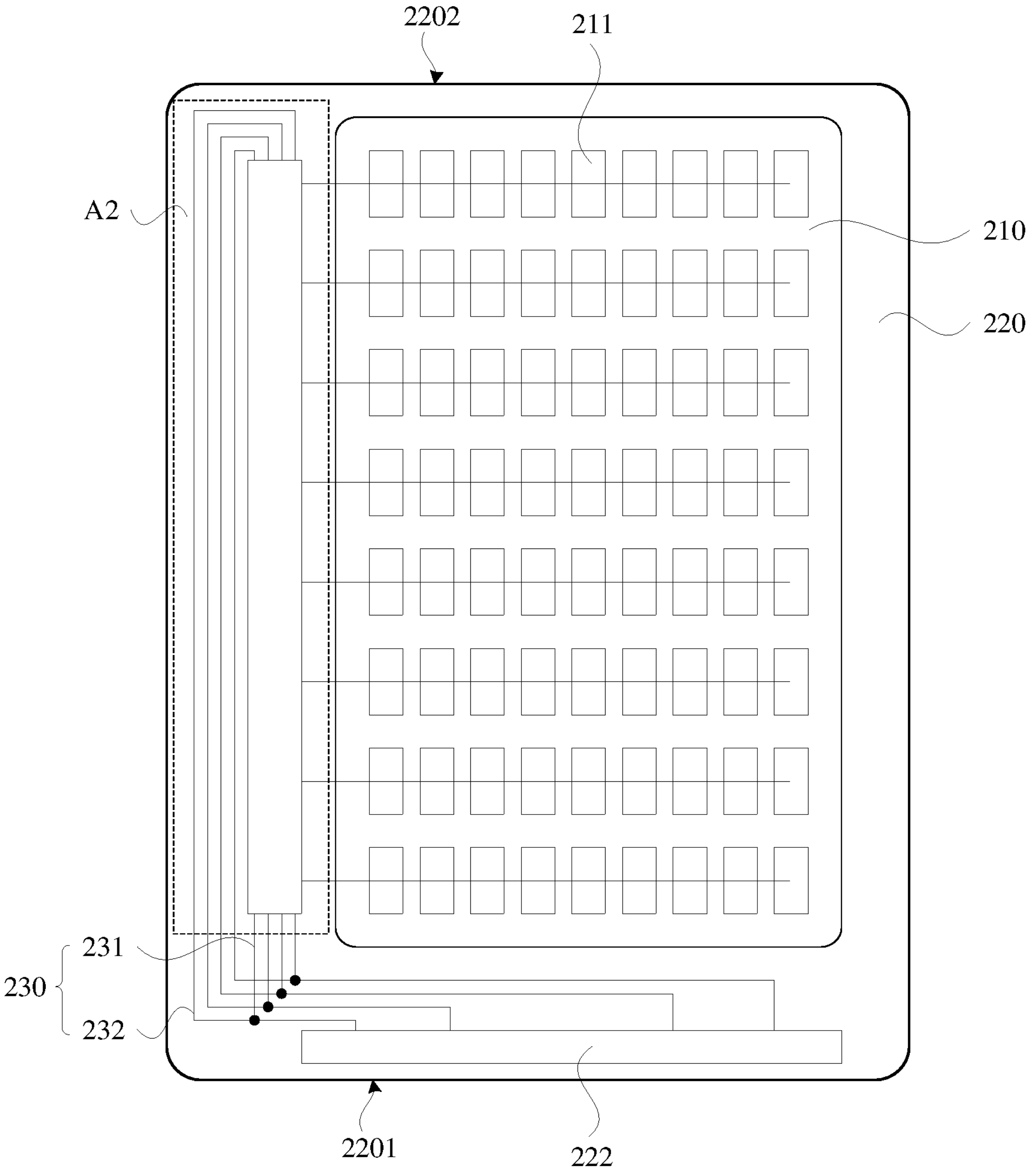
FIG. 3 is a diagram illustrating the structure of a display panel according to an embodiment of the present application.
Figure 4:
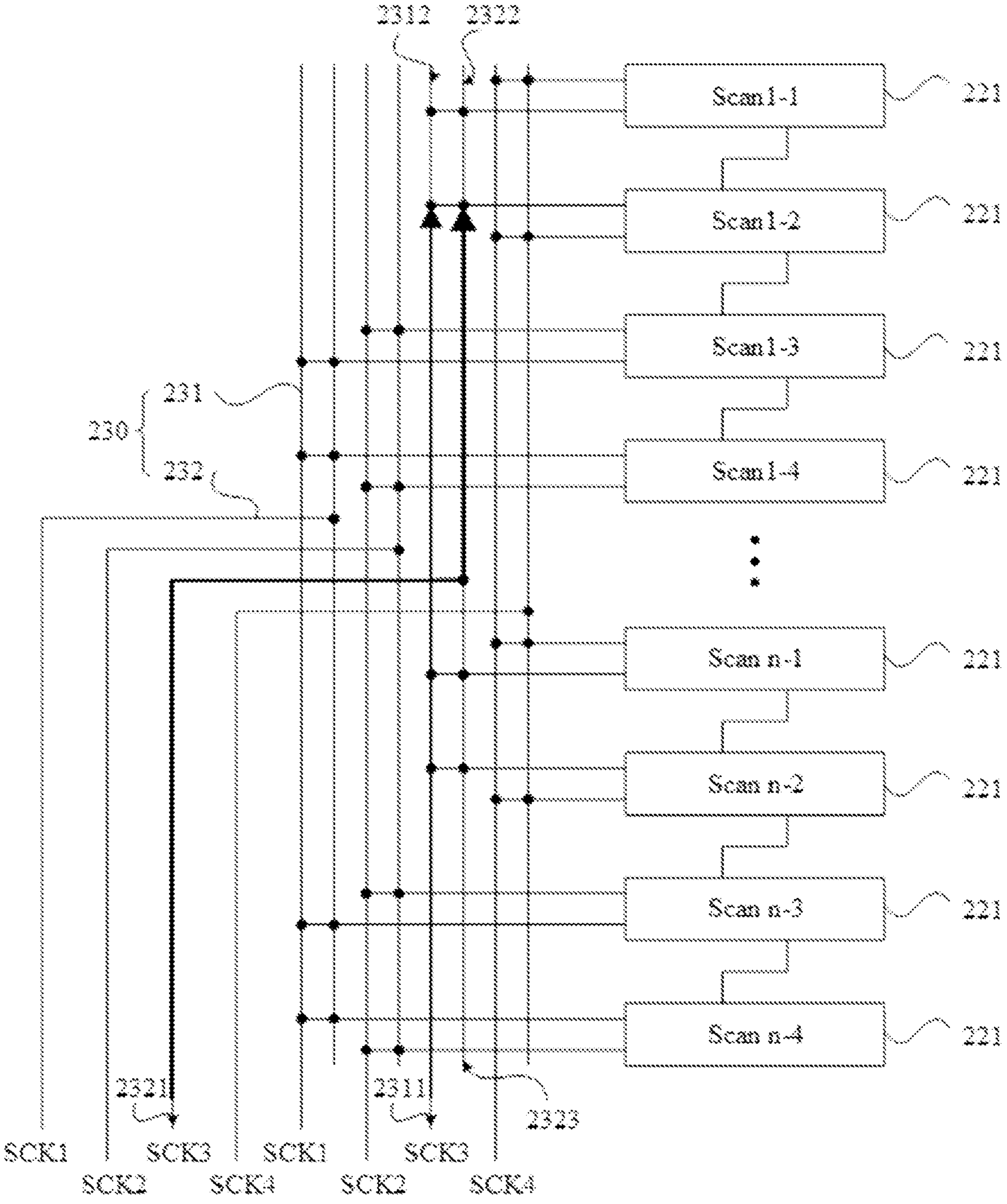
FIG. 4 is a view illustrating the structure of region A2 in the display panel of FIG. 3.

FIG. 3 is a diagram illustrating the structure of a display panel according to an embodiment of the present application. The display panel also includes a first side 2201 and a second side 2202 which are disposed oppositely in the first direction. FIG. 4 is a view illustrating the structure of region A2 in the display panel of FIG. 3. Referring to FIGS. 3 and 4, the display panel includes a display region 210 and a non-display region 220. The display region 210 is provided with pixel units 211 arranged in an array.

The display panel also includes at least two controlled modules 221 and a signal wire 230 connected to the at least two controlled modules 221. The signal wire 230 is configured to receive a drive signal sent by a drive module 222 and transmit the drive signal to the at least two controlled modules 221. The controlled modules 221 and the drive module 222 correspond to each other. The drive module 222 sends the drive signal to the controlled modules 221. The controlled modules 221 receive the drive signal. In the display panel, there are various combinations of the controlled modules 221 and the drive module 222. For example, the controlled modules 221 are shift registers, and the drive module 222 is a drive IC. For another example, the control modules 221 are pixel circuits, and the drive module 222 is a shift register. For another example, the control modules 221 are pixel circuits, and the drive module 222 is a data drive module. However, for the display panel, there are many controlled modules 221. There is a difference between the signal received by a controlled module 221 farther away from the drive module 222 and the signal received by a controlled module 221 more adjacent to the drive module 222.

In this embodiment of the present application, the wire connection mode of the signal wire 230 between the controlled modules 221 and the drive module 222 is improved to reduce this difference. A description is given by using an example in which the controlled modules 221 are shift registers.

Further referring to FIGS. 3 and 4, the signal wire 230 connecting the controlled modules 221 and the drive module 222 includes a first path wire section 231 and a second path wire section 232. A first end 2311 of the first path wire section 231 and a first end 2321 of the second path wire section 232 are configured to receive the same drive signal, for example, the clock signal SCK3. The first path wire section 231 sequentially transmits the drive signal to the at least two controlled modules 221 in a first preset sequence. The second path wire section 232 sequentially transmits the drive signal to the at least two controlled modules 221 in a second preset sequence. The first preset sequence and the second preset sequence are different. That is, the wire connection mode of the first path wire section 231 and the wire connection mode of the second path wire section 232 are different, so that there are two paths for the drive signal to be transmitted to each controlled module 221.

For example, as shown in FIG. 4, the first path wire section 231 is connected to a controlled module 221 at a position adjacent to the first end 2311 of the first path wire section 231 and is connected to the controlled module 221 adjacent to a second end 2312 of the first path wire section 231 stage by stage. The second path wire section 232 is wired at a position adjacent to the first end 2321 of the second path wire section 232 and starts to be connected to a controlled module 221 when the wire reaches the middle position of the second path wire section 232. In one aspect, the second path wire section 232 is connected upward to the controlled module 221 (that is, shift register Scan 1-1) adjacent to a second end 2322 of the second path wire section 232 stage by stage. In another aspect, the second path wire section 232 is connected to the controlled module 221 (that is, shift register Scan n-4) adjacent to a third end 2323 of the second path wire section 232 stage by stage.

For example, for shift register Scan 1-1 located adjacent to the side opposite to the drive module 222, a first path corresponding to the first path wire section 231 is that the clock signal SCK3 sequentially passes through shift register Scan n-2, shift register Scan n-1, . . . , shift register Scan n/2-1, that is, the shift register located in the middle, . . . , and shift register Scan 1-2 and then is transmitted to shift register Scan 1-1. A second path corresponding to the second path wire section 232 is that the clock signal SCK3 sequentially passes through shift register Scan n/2-1, that is, the shift register located in the middle, . . . , and shift register Scan 1-2 and then is transmitted to shift register Scan 1-1. In comparison to the first path, the drive signal in the second path passes through a smaller number of shift registers before the drive signal is transmitted to shift register Scan 1-1. The RC delay caused by the RC load of multiple stages of shift registers is smaller. The clock signal SCK3 is first transmitted to shift register Scan 1-1 in the second path.

It can be seen that, compared with the related art, in this embodiment of the present application described in FIG. 3 and FIG. 4, the second path wire section 232 is disposed. The connection node between the second path wire section 232 and the controlled module 221 most adjacent to the first side 2201 is farther away from the first side 2201 than the connection node between the first path wire section 231 and the controlled module 221 most adjacent to the first side 2201. The SCK signals transmitted by the two paths are superimposed, so that the time to reach an effective level increases. The RC delay of the drive signal received by the controlled module 221 located in the X direction adjacent to the second side 2202 is reduced. The characteristic difference between the Tr/Tf of the drive signal received by the controlled module 221 adjacent to the second side 2202 in the X direction and the Tr/Tf of the drive signal received by the controlled module 221 adjacent to the first side 2201 in the X direction are reduced. In this manner, the difference in the charging time of a pixel circuit is reduced, and the display uniformity is improved.

An embodiment of the first preset sequence and the second preset sequence is exemplarily shown in FIG. 4. The display panel also includes at least two controlled modules 221. One of the at least two controlled modules 221 is adjacent to the first side 2201, for example, selected from Scan n-1, Scan n-2, Scan n-3, and Scan n-4. The other controlled module adjacent to the second side 2202, for example, selected from Scan 1-1, Scan 1-2, Scan 1-3, and Scan 1-4. The middle position is between one controlled module adjacent to the first side 2201 and the other controlled module adjacent to the second side 2202.

The first preset sequence is that the drive signal first passes through the controlled module adjacent to the first side 2201 and then is transmitted to the controlled module adjacent to the second side 2202. That is, among the at least two controlled modules, the drive signal first passes through one controlled module more adjacent to the first side 2201 and then is transmitted to the other controlled module.

The second preset sequence is that the drive signal passes through the middle position, directly passes over the controlled module more adjacent to the first side 2201, and then is transmitted to the controlled module more adjacent to the second side 2202. When the at least two controlled modules are more than two controlled modules, the second preset sequence is that the drive signal is first input into the controlled module located more adjacent to the middle position between the second side 2202 and the middle position and then is transmitted to the controlled module more adjacent to the second side 2202.

In other embodiments, the first preset sequence and the second preset sequence are changed so that the uniformity of the display panel can be improved.

Figure 5:
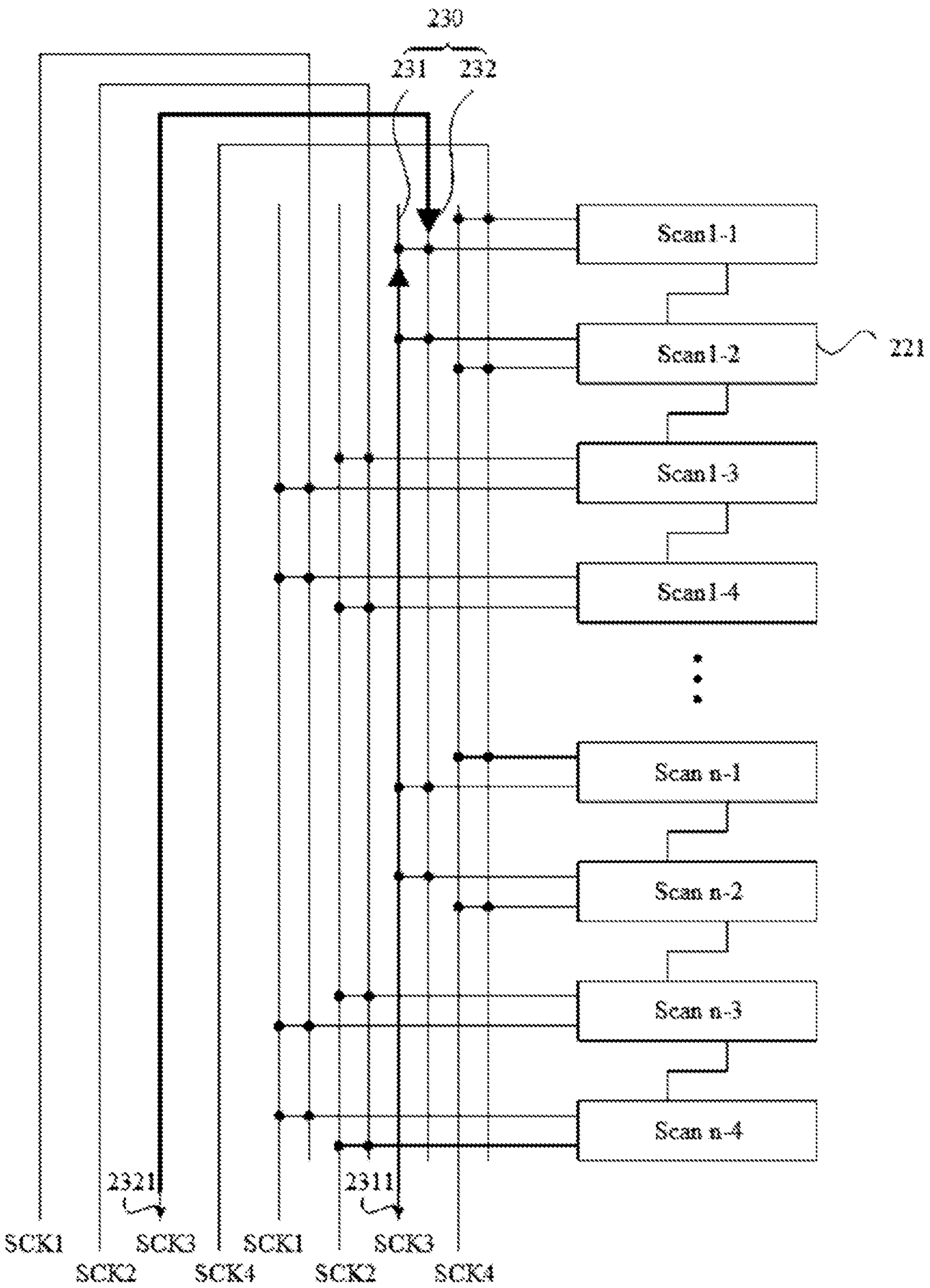
FIG. 5 is a view illustrating another structure of region A2 in the display panel of FIG. 3.

FIG. 5 is a view illustrating another structure of region A2 in the display panel of FIG. 3. Referring to FIGS. 3 and 5, in an embodiment of the present application, the first end 2311 of the first path wire section 231 and the first end 2321 of the second path wire section 232 receive the drive signal respectively. The first preset sequence is that the controlled module 221 more adjacent to the first side 2201 receives the drive signal before the other controlled module 221, that is, the drive signal is first input into the controlled module 221 adjacent to the first side 2201 among the multiple controlled modules 221. For example, shift register Scan n-2 first receives the signal before Scan 1-2. The second preset sequence is that the controlled module 221 farther away from the first side 2201 receives the drive signal before the other controlled module 221, that is, the drive signal is first input into the controlled module 221 far away from the first side 2201 among the multiple controlled modules 221. For example, shift register Scan 1-2 receives the signal before Scan n-2. That is, the first preset sequence and the second preset sequence are completely opposite.

For example, the first path wire section 231 extends to the second side 2202 in the X direction. The first path wire section 231 is connected to shift register Scan n-2 at a position more adjacent to the first side 2201 and is connected upward to shift register Scan 1-1 stage by stage. The second path wire section 232 is wired toward the second side 2202 from the position of the first end 2321 of the second path wire section 232, and the wire is connected to shift register Scan 1-1 adjacent to the second side 2202. The second path wire section 232 is connected downwardly from shift register Scan 1-1 to shift register Scan n-2 stage by stage. That is, the drive signal is output from the first side 2201 and the second side 2202 to the middle between the first side 2201 and the second side 2202.

For shift register Scan 1-1 adjacent to the second side 2202, the first path is that the clock signal SCK3 sequentially passes through shift register Scan n-2, shift register Scan n-1, . . . , and shift register Scan 1-2 and then is transmitted to shift register Scan 1-1. The second path is that the clock signal SCK3 is transmitted directly to shift register Scan 1-1. The connection node between the second path wire section 232 and the controlled module 221 most adjacent to the first side 2201 is farther away from the first side 2201 than the connection node between the first path wire section 231 and the controlled module 221 most adjacent to the first side 2201.

The related art is compared with the embodiment in FIG. 5, and an example of shift register group Scan 1 adjacent to the second side 2202 and shift register group Scan n adjacent to the first side 2201 is used. Shift register group Scan 1 includes Scan 1-1, Scan 1-2, Scan 1-3, and Scan 1-4. Shift register group Scan n includes Scan n-1, Scan n-2, Scan n-3, and Scan n-4. The resistance data and capacitance data borne by the clock signal SCK3 are shown in Table 1. R denotes the increased resistance when a stage of shift register is added. Ro denotes the resistance of the wire section (also referred to as the winding section). C denotes the increased capacitance when a stage of shift register is added.

TABLE 1

| Embodiment | Shift register | Resistance | Capacitance |
|---|---|---|---|
| Related art | Scan 1 | 4nR | 4nC |
| | Scan n | 4R | 4C |
| The embodiment described in FIG. 5 | Scan 1 | 2nR | C |
| | Scan n | 4R | 4C |

The resistance of Scan 1 in the embodiment described in FIG. 5 is Ro*4 nR/(Ro+4 nR). Ro=4 nR is brought in, and the resistance of Scan 1 is 2 nR. As can be seen from table 1, in FIG. 5, the RC delay of the load borne by the clock signal SCK3 corresponding to the shift register adjacent to the second side 2202 and the RC delay of the load borne by the clock signal SCK3 corresponding to the shift register adjacent to the first side 2201 are very small and may be approximately equal. Accordingly, the characteristic such as the Tr/Tf of the clock signal SCK3 may be considered to be equal. For this reason, this embodiment of the present application reduces the difference in the charging time of the pixel circuit and improves the display uniformity.

Figure 6:
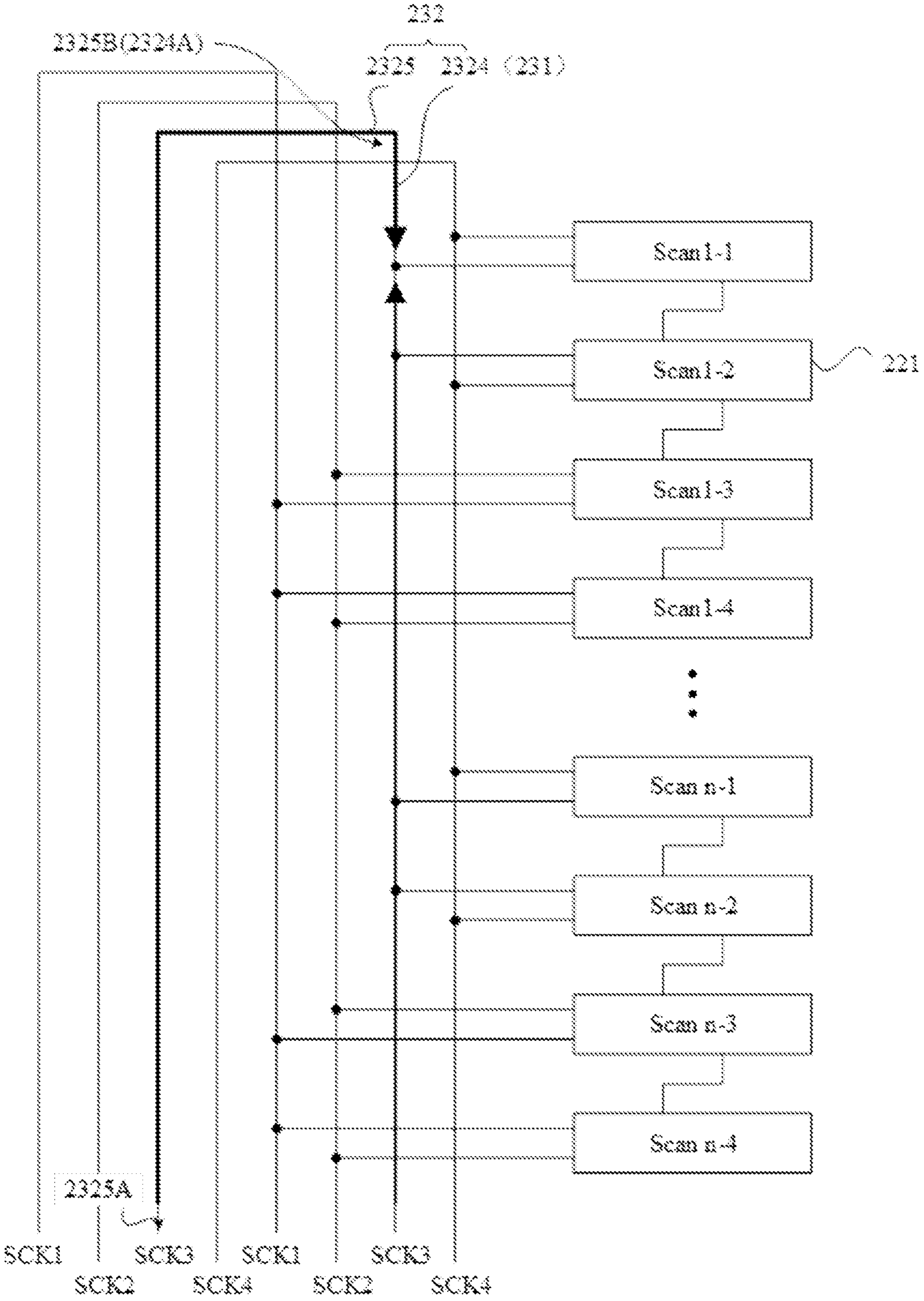
FIG. 6 is a view illustrating another structure of region A2 in the display panel of FIG. 3.

FIG. 6 is a view illustrating another structure of region A2 in the display panel of FIG. 3. Referring to FIGS. 3 and 6, in an embodiment of the present application, the second path wire section 232 includes a transmission subsection 2324 and a winding subsection 2325. The transmission subsection 2324 is connected to the controlled modules 221. The first path wire section 231 also serves as the transmission subsection 2324. The winding subsection 2325 extends from a first end of the winding subsection 2325A to a second end 2325B of the winding subsection 2325. The first end 2325A of the winding subsection 2325 receives the drive signal. The second end 2325B of the winding subsection 2325 is connected to the end 2324A of the first path wire section 231 adjacent to the second side 2202. This configuration of this embodiment of the present application simplifies the space occupied by the second path wire section 232 on the basis of the improvement of the display uniformity, thereby reducing the difficulty of the wire design of the display panel.

In the preceding embodiment, for example, the signal wire 230 includes only a first path wire section 231 and a second path wire section 232. In other embodiments, as shown in FIG. 7, the signal wire 230 is also configured to include a third path wire section 233, that is, the drive signal is transmitted to the controlled module 221 through at least three paths to improve the display uniformity.

Figure 7:
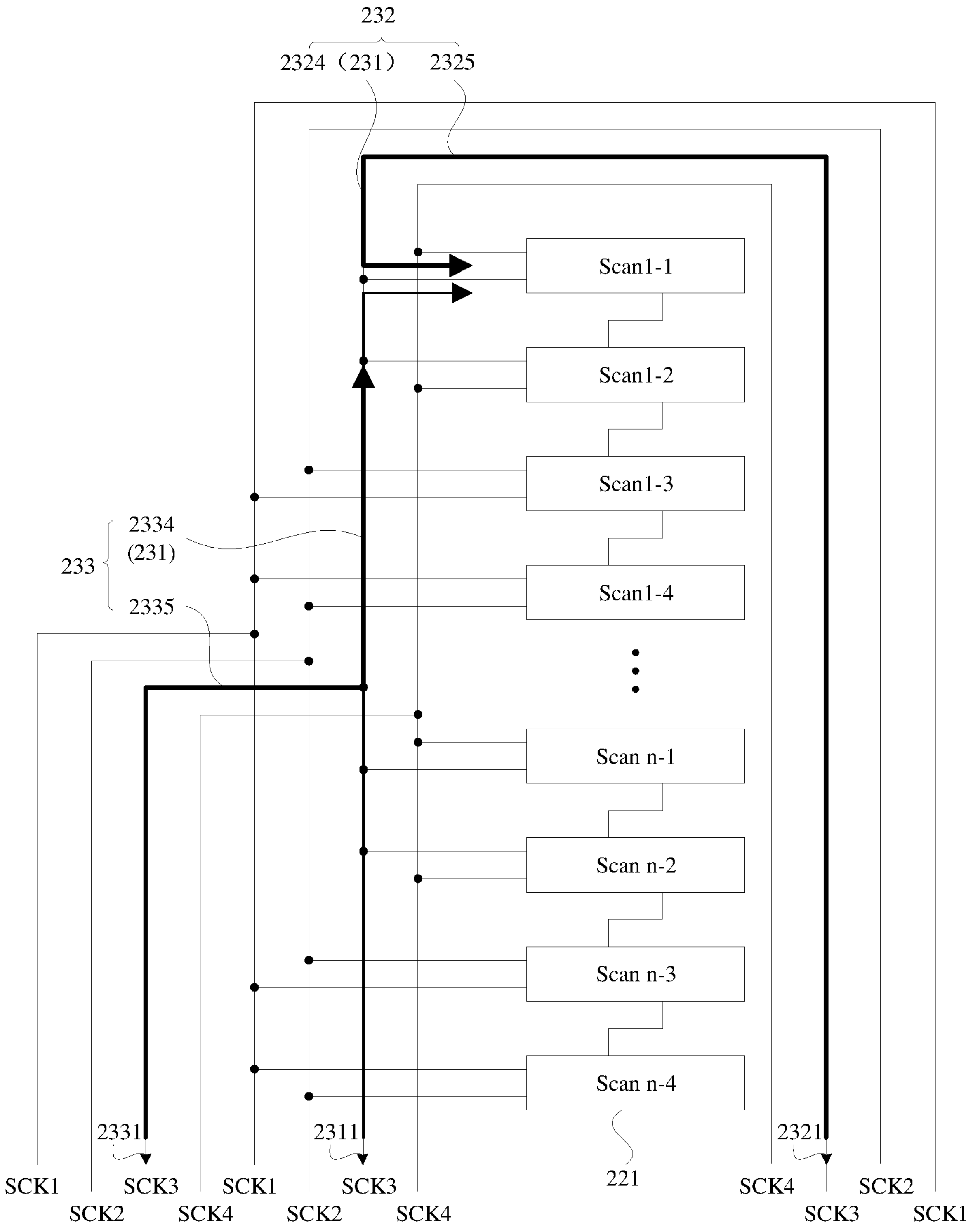
FIG. 7 is a view illustrating another structure of region A2 in the display panel of FIG. 3.

FIG. 7 is a view illustrating another structure of region A2 in the display panel of FIG. 3. Referring to FIG. 7, in an embodiment of the present application, the third path wire section 233 is the same as the first path wire section 231 and the second path wire section 232 in that the first end 2331 of the third path wire section 233 is configured to receive the clock signal SCK3. The third path wire section 233 sequentially transmits the drive signal to the at least two controlled modules 221 in a third preset sequence. The first preset sequence, the second preset sequence, and the third preset sequence are different.

The third preset sequence is that the drive signal passes through the middle position and then is transmitted to the controlled module adjacent to the second side 2202 without passing through the controlled module adjacent to the first side 2201. That is, among the at least two controlled modules, the drive signal does not pass through one controlled module more adjacent to the first side 2201 but is transmitted to the other controlled module. When the at least two controlled modules are more than two controlled modules, the third preset sequence is that the drive signal is first transmitted to the controlled module located more adjacent to the middle position between the second side 2202 and the middle position and then is transmitted to the controlled module adjacent to the second side 2202.

For example, the first path wire section 231 extends from the first side 2201 to the second side 2202, is connected to shift register Scan n-2 at a position adjacent to the first side 2201, and is connected upward to shift register Scan 1-1 stage by stage. The second path wire section 232 is wired at the position adjacent to the first end 2321 of the first side 2201, and the wire reaches shift register Scan 1-1 adjacent to the second side 2202. The second path wire section 232 is connected downwardly from shift register Scan 1-1 to shift register Scan n-2 stage by stage. The second path wire section 232 includes a transmission subsection 2324 and a winding subsection 2325. The transmission subsection 2324 is connected to the controlled modules 221. The first path wire section 231 also serves as the transmission subsection 2324. The third path wire section 233 extends from the middle of the third path wire section 233 toward the first side 2201 and extends from the middle of the third path wire section 233 toward the second side 2202. The third path wire section 233 includes a transmission subsection 2334 and a winding subsection 2335. The transmission subsection 2324 is connected to the controlled modules 221. The first path wire section 231 also serves as the transmission subsection 2334.

With this configuration of this embodiment of the present application, it is not only beneficial to reduce the difference between the drive signal received by the controlled module 221 adjacent to the second side 2202 and the drive signal received by the controlled module 221 adjacent to the first side 2201, but also beneficial to reduce the difference between the drive signal received by the controlled module 221 located in the middle between the first side 2201 and the second side 2202 and the drive signal received by the controlled module 221 adjacent to the first side 2201.

In this manner, the difference of the drive signal received by each controlled module 221 is reduced, so that the difference in the charging time of the pixel circuit is smaller, and the display uniformity is improved.

In the preceding embodiment, for example, the connection relationship between the signal wire 230 and multiple controlled modules 221 is described. On the basis of the preceding embodiment, in this embodiment of the present application, the disposition position of the second path wire section 232 is limited. Various disposition positions of the signal wire 230 are described below.

Figure 8:
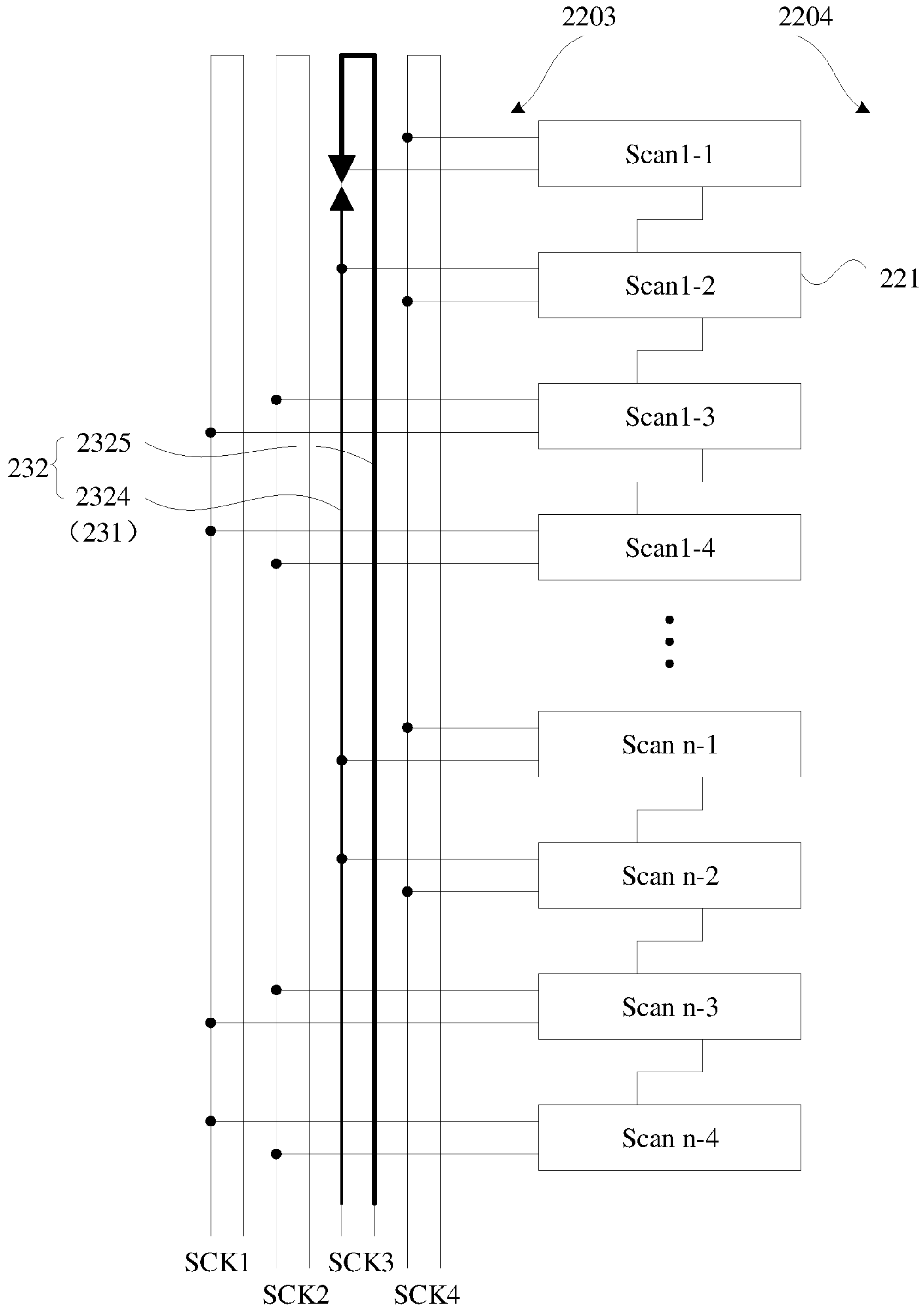
FIG. 8 is a view illustrating another structure of region A2 in the display panel of FIG. 3.

FIG. 8 is a view illustrating another structure of region A2 in the display panel of FIG. 3. Referring to FIGS. 4 to 6, and 8, in an embodiment of the present application, the display panel also includes a first side region 2203 and a second side region 2204 disposed on two sides of the at least two controlled modules respectively. The first path wire section 231 and the second path wire section 232 are each disposed in the first side region 2203. For example, in FIG. 4, multiple second path wire sections 232 are all wired through the left side region of the first path wire section 231 and are connected to the remaining part of the controlled modules 221 after winding part of the controlled modules 221. In FIG. 5, multiple second path wire sections 232 are all wired through the left side region of the first path wire section 231, and the wire reaches the controlled module adjacent to the second side 2202 to provide the drive signal to the controlled module 221 in the reverse sequence of the first path wire section 231. The difference between FIG. 6 and FIG. 5 is that the first path wire section 231 in FIG. 6 also serves as the transmission subsection 2324 of the second path wire section 232. In FIG. 8, multiple second path wire sections 232 are wired through the right side region of the corresponding first path wire section 231.

In an embodiment of the present application, similar to the case where the first path wire section 231 and the second path wire section 232 are each disposed in the first side region 2203, the first path wire section 231 and the second path wire section 232 are each disposed in the second side region 2204, and the details are not repeated here.

Figure 9:
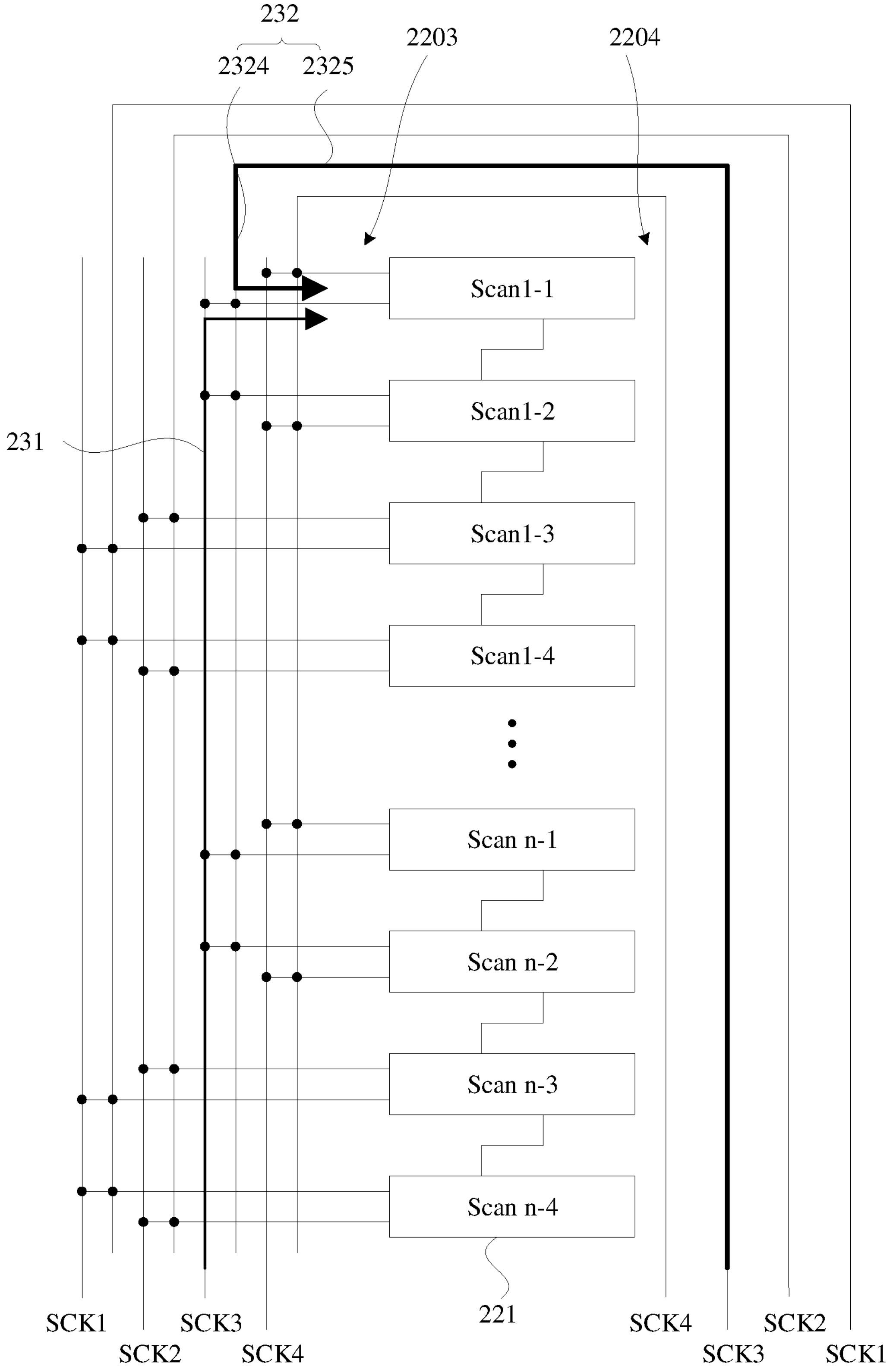
FIG. 9 is a view illustrating another structure of region A2 in the display panel of FIG. 3.
Figure 10:
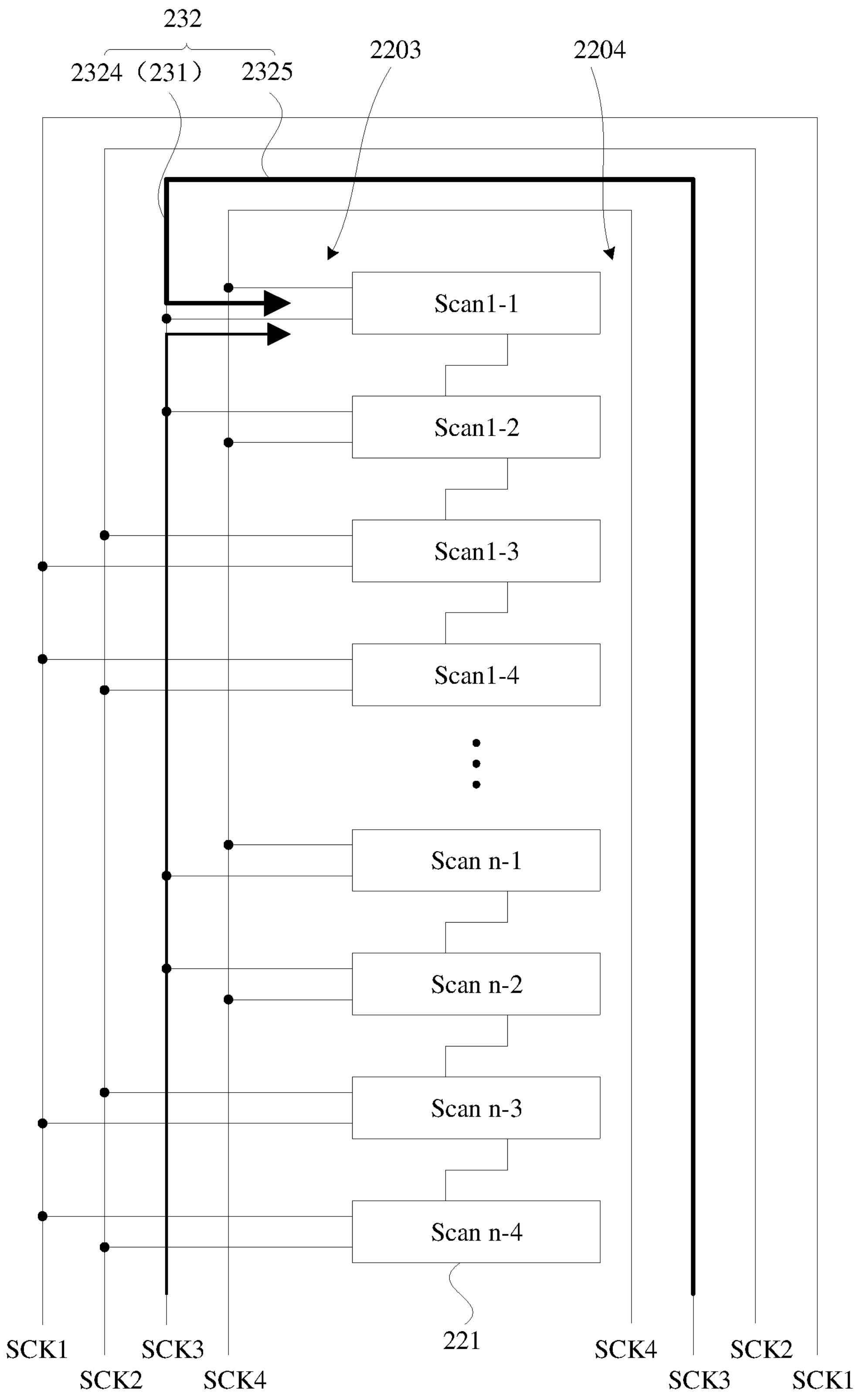
FIG. 10 is a view illustrating another structure of region A2 in the display panel of FIG. 3.

FIG. 9 is a view illustrating another structure of region A2 in the display panel of FIG. 3. FIG. 10 is a view illustrating another structure of region A2 in the display panel of FIG.

3. Referring to FIGS. 7, 9, and 10, in an embodiment of the present application, the first path wire section 231 is disposed in the first side region 2203. The second path wire section 232 is disposed in the first side region 2203 and the second side region 2204. In the second side region 2204, the second path wire section 232 extends from the first side 2201 to the second side 2202. For example, in FIG. 9, the second path wire section 232 is wound from the second side region 2204 to the first side region 2203. The second path wire section 232 is first connected to the controlled module 221 adjacent to the second side 2202 to provide the drive signal to each controlled module 221 in the reverse sequence of the first path wire section 231. The difference between FIG. 10 and FIG. 9 is that the first path wire section 231 in FIG. 10 also serves as the transmission subsection 2324 of the second path wire section 232. The difference between FIG. 7 and FIG. 10 is that the signal wire 230 also includes a third path wire section 233. Third path wire sections 233 are all wound through the left side region of the first path wire section 231 and are connected to the remaining part of the controlled modules 221 after winding part of the controlled modules 221.

In the preceding embodiment, a description is given by using an example in which the controlled module 221 includes a shift register, and the signal wire 230 includes a clock signal line. In this manner, the difference in the shift of the shift register to the clock signal is reduced. In other embodiments, the signal wire 230 connected to the shift register may also be configured to include a power signal line or a reference voltage signal line to reduce the difference of a corresponding signal and to improve the display uniformity.

Figure 11:
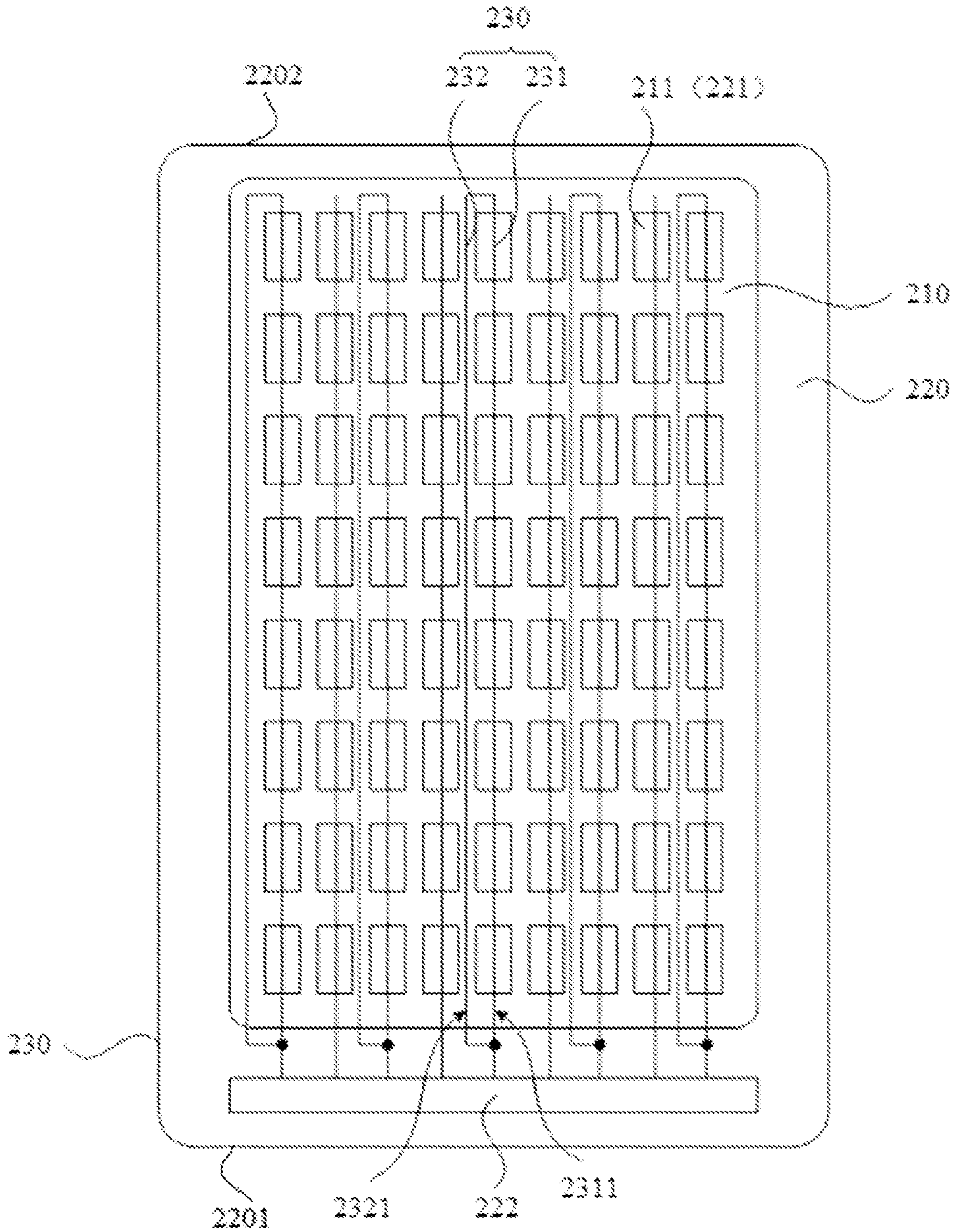
FIG. 11 is a diagram illustrating the structure of another display panel according to an embodiment of the present application.

FIG. 11 is a diagram illustrating the structure of another display panel according to an embodiment of the present application. Referring to FIG. 11, in an embodiment of the present application, the controlled modules 221 are located at a display region 210 of the display panel. The controlled modules 221 include pixel circuits. The drive module 222 is a data drive module. The signal wire 230 is a data line. The signal wire 230 includes a first path wire section 231 and a second path wire section 232. The first end 2311 of the first path wire section 231 and the first end 2321 of the second path wire section 232 are configured to receive the same data signal. The first path wire section 231 sequentially transmits the drive signal to the at least two controlled modules 221 in the first preset sequence. The second path wire section 232 sequentially transmits the drive signal to the at least two controlled modules 221 in the second preset sequence. The first preset sequence and the second preset sequence are different. For the connection between the pixel circuit and the first path wire section 231 and the second path wire section 232, reference may be made to the preceding embodiment. In this embodiment of the present application, the signal wire 230 is configured to the data line. The difference between the signal received by the pixel circuit adjacent to the second side 2202 and the signal received by the pixel circuit adjacent to the first side 2201 is reduced, so that the difference in the charging time of the pixel circuit is small, and the display uniformity is improved.

Figure 12:
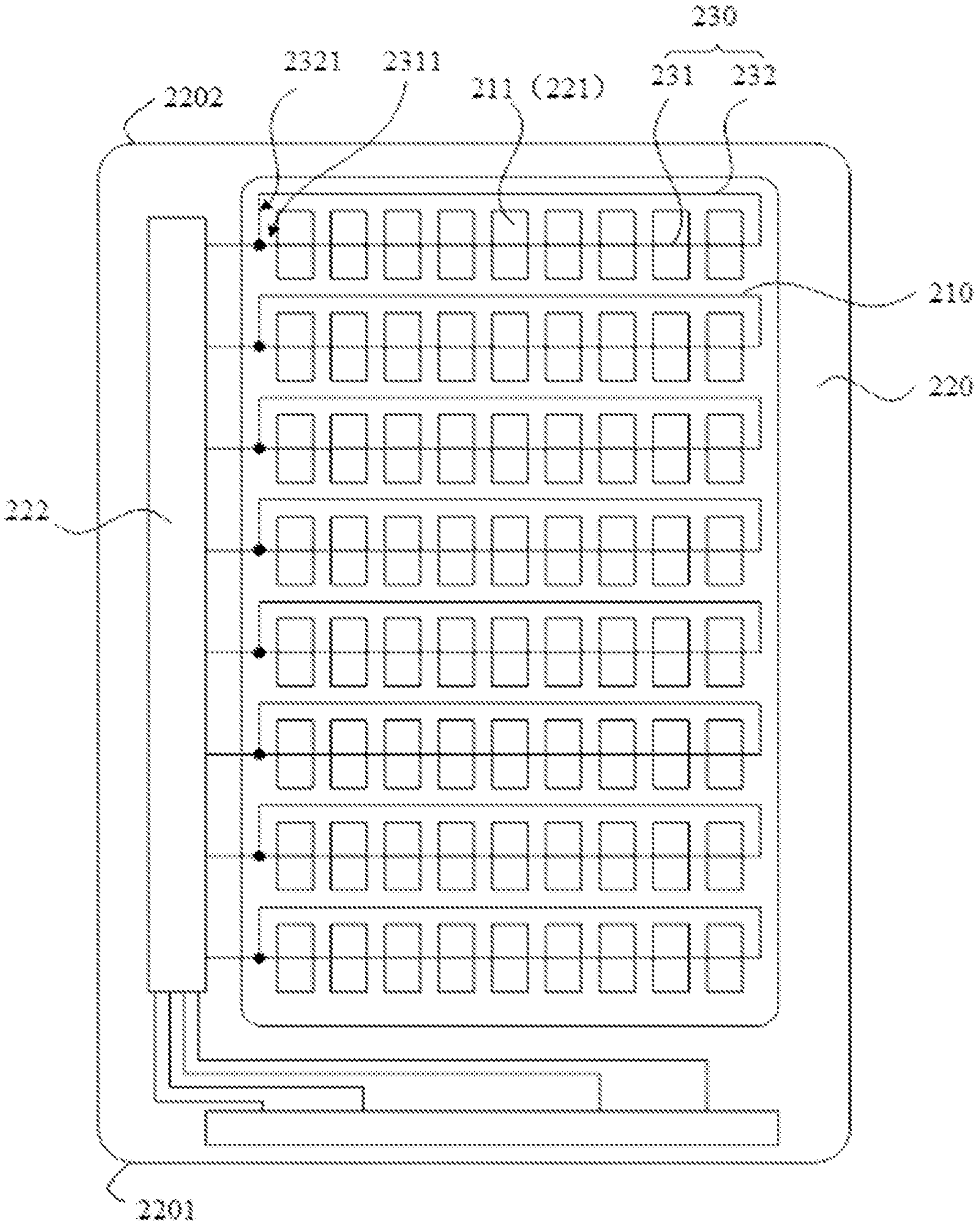
FIG. 12 is a diagram illustrating the structure of another display panel according to an embodiment of the present application.

FIG. 12 is a diagram illustrating the structure of another display panel according to an embodiment of the present disclosure. Referring to FIG. 12, in an embodiment of the present application, the controlled modules 221 include pixel circuits. The drive module 222 is a shift register. The signal wire 230 is a scan line or an initialization signal line. The signal wire 230 includes a first path wire section 231 and a second path wire section 232. The first end 2311 of the first path wire section 231 and the first end 2321 of the second path wire section 232 are configured to receive the same scan signal or initialization signal. The first path wire section 231 sequentially transmits the drive signal to the at least two controlled modules 221 in the first preset sequence. The second path wire section 232 sequentially transmits the drive signal to the at least two controlled modules 221 in the second preset sequence. The first preset sequence and the second preset sequence are different. In this embodiment of the present application, the signal wire 230 is configured to be a scan line or an initialization signal line. The difference between the signal received by the pixel circuit adjacent to the second side 2202 and the signal received by the pixel circuit adjacent to the first side 2201 is reduced, so that the difference in the charging time of the pixel circuit is small, and the display uniformity is improved.

On the basis of the preceding embodiment, the first path wire section 231 and the second path wire section 232 are disposed in the same layer or disposed in different layers. For example, if the wire space of the film where the first path wire section 231 is located is sufficient, the second path wire section 232 and the first path wire section 231 may be disposed in the same layer to make the display panel thin and light. If the wire space of the film where the first path wire section 231 is located is limited, at least part of the second path wire section 232 may be disposed in the same layer as other films in the display panel to make the display panel thin and light.

Referring to FIGS. 3, 11, and 12, on the basis of the preceding embodiment, the drive module 222 is disposed on the display panel. The first end 2311 of the first path wire section 231 and the first end 2321 of the second path wire section 232 are connected to the same port of the drive module 222. For example, in FIG. 3, the controlled modules 221 are shift registers, and the drive module 222 is a drive IC. An end of the drive module 222 may be located below the display region 210, or may be bent to the back of the display panel, and may be configured according to requirements in practical applications. In FIG. 11, the control modules 221 are pixel circuits. The drive module 222 is a data drive module. An end of the drive module 222 may be located below the display region 210, or may be bent to the back of the display panel, and may be configured according to requirements in practical applications. In FIG. 12, the control modules 221 are pixel circuits. The drive module 222 is a shift register. An end of the drive module 222 may be located on the left side of the display region 210.

Figure 13:
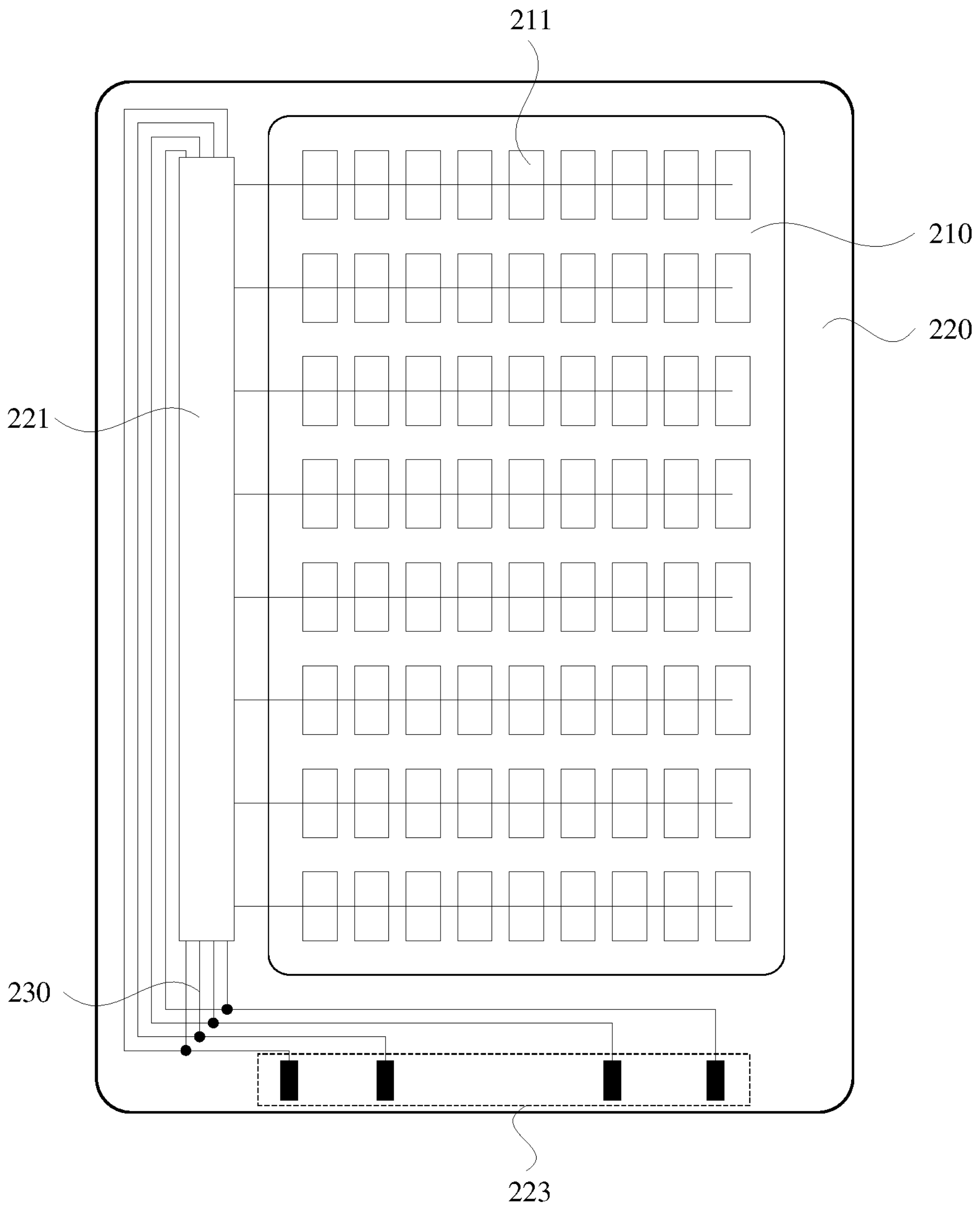
FIG. 13 is a diagram illustrating the structure of another display panel according to an embodiment of the present application.

FIG. 13 is a diagram illustrating the structure of another display panel according to an embodiment of the present disclosure. Referring to FIG. 13, in an embodiment of the present application, the display panel includes a bonding region 223. The bonding region 223 is provided with at least two pads. The drive module is configured to provide the drive signal to the display panel through the bonding region 223. The first end of the first path wire section 231 and the first end of the second path wire section 232 are connected to the same pad of the bonding region 223. The flexible circuit board of the drive module is bonded to the bonding region 223 for the transmission of the drive signal.

In summary, in this embodiment of the present application, the signal wire 230 connecting the controlled modules 221 and the drive module 222 is configured to include a first path wire section 231 and a second path wire section 232. The first path wire section 231 sequentially transmits the drive signal to the at least two controlled modules 221 in the first preset sequence. The second path wire section 232 sequentially transmits the same drive signal as the drive signal transmitted through the first preset sequence to the at least two controlled modules 221 in the second preset sequence. The first preset sequence and the second preset sequence are different. Compared with the related art, in this embodiment of the present application, the RC delay of the drive signal received by the controlled module 221 located adjacent to the second side 2202 is reduced. The characteristic difference between the Tr/Tf of the drive signal received by the controlled module 221 adjacent to the second side 2202 and the Tr/Tf of the drive signal received by the controlled module 221 adjacent to the first side 2201 are reduced. In this manner, the difference in the charging time of the pixel circuit is reduced, and the display uniformity is improved.

An embodiment of the present application provides a display device. The display device may be, for example, a product such as a mobile phone, a computer, a tablet computer, a wearable device, a smart home, a smart home appliance, an e-book, and an information inquiry machine. The display device includes the display panel according to any embodiment of the present application. The effect of the display device is similar to the effect of the display panel, and the details are not repeated here.

It is to be noted that the above are only preferred embodiments of the present application and the principles used therein. It will be understood by those skilled in the art that the present application is not limited to the specific embodiments described herein. Those skilled in the art can make various apparent variations, adaptions, and substitutions without departing from the scope of the present application. Therefore, while the present application has been described in detail via the preceding embodiments, the present application is not limited to the preceding embodiments and may include more other equivalent embodiments without departing from the concept of the present invention. The scope of the present application is determined by the scope of the appended claims.

What is claimed is:

1. A display panel comprising:

at least two controlled modules;

a first side and a second side which are disposed oppositely in a first direction; and a signal wire connected to the at least two controlled modules, wherein the signal wire is configured to receive a drive signal sent by a drive module and transmit the drive signal to the at least two controlled modules, the signal wire comprises a first path wire section and a second path wire section, a first end of the first path wire section and a first end of the second path wire section are configured to receive a same drive signal, the first path wire section is configured to sequentially transmit the drive signal to the at least two controlled modules in a first preset sequence, the second path wire section is configured to sequentially transmit the drive signal to the at least two controlled modules in a second preset sequence, wherein a first side region and a second side region are disposed on two sides of the at least two controlled modules respectively, and each of the first path wire section and the second path wire section is disposed in the first side region or the second side region;

in the first preset sequence, among the at least two controlled modules, the drive signal first passes through one controlled module more adjacent to the first side and then is transmitted to an other controlled module, and in the second preset sequence, among the at least two controlled modules, the drive signal does not pass through the one controlled module more adjacent to the first side but is transmitted to the other controlled module and the controlled module farther away from the first side receives the drive signal before the other controlled module.

2. The display panel according to claim 1, wherein the second path wire section further comprises:

a transmission subsection; and a winding subsection, wherein the transmission subsection is connected to the at least two controlled modules, and the first path wire section also serves as the transmission subsection, the winding subsection extends from a first end of the winding subsection to a second end of the winding subsection, the first end of the winding subsection receives the drive signal, and the second end of the winding subsection is connected to an end of the first path wire section adjacent to the second side.

3. The display panel according to claim 1, wherein the signal wire further comprises:

a third path wire section, a first end of the third path wire section and the first end of the first path wire section are configured to receive a same drive signal, the third path wire section sequentially transmits the drive signal to the at least two controlled modules in a third preset sequence, and the first preset sequence, the second preset sequence, and the third preset sequence are different.

4. The display panel according to claim 3, wherein, in the third preset sequence, among the at least two controlled modules, the drive signal does not pass through the one controlled module more adjacent to the first side but is transmitted to the other controlled module.

5. The display panel according to claim 1, wherein the at least two controlled modules are located at a non-display region of the display panel, a controlled module of the at least two controlled modules comprises a shift register, and the signal wire comprises at least one of a clock signal line, or a power signal line.

6. The display panel according to claim 5, wherein the drive module comprises a drive integrated circuit.

7. The display panel according to claim 1, wherein the at least two controlled modules are located at a display region of the display panel, a controlled module of the at least two controlled modules comprises a pixel circuit, and the signal wire comprises at least one of a data line, a scan line, or an initialization signal line.

8. The display panel according to claim 7, wherein the drive module comprises a shift register.

9. The display panel according to claim 1, wherein the first path wire section and the second path wire section are disposed in a same layer or disposed in different layers.

10. The display panel according to claim 1, further comprising:

a middle position, wherein among the at least two controlled modules, the middle position is located between one controlled module most adjacent to the first side and the other controlled module most adjacent to the second side, in the first preset sequence, among the at least two controlled modules, the drive signal is first transmitted to the one controlled module more adjacent to the first side and then is transmitted to the other controlled module; and in the second preset sequence, among the at least two controlled modules, the drive signal does not pass through the one controlled module adjacent to the first side but is transmitted to the other controlled module through the middle position.

11. The display panel according to claim 1, further comprising:

a bonding region, wherein the drive module is configured to provide the drive signal to the display panel through the bonding region.

12. The display panel according to claim 11, wherein the bonding region is provided with at least two pads, and the first end of the first path wire section and the first end of the second path wire section are connected to a same pad in the bonding region.

13. The display panel according to claim 1, wherein the first preset sequence and the second preset sequence are different.

14. A display panel, comprising:

at least two controlled modules; and a signal wire connected to the at least two controlled modules, wherein the signal wire is configured to receive a drive signal sent by a drive module and transmit the drive signal to the at least two controlled modules, the signal wire comprises a first path wire section and a second path wire section, a first end of the first path wire section and a first end of the second path wire section are configured to receive a same drive signal, the first path wire section is configured to sequentially transmit the drive signal to the at least two controlled modules in a first preset sequence, the second path wire section is configured to sequentially transmit the drive signal to the at least two controlled modules in a second preset sequence, the at least two controlled modules are located at a non-display region of the display panel, a controlled module of the at least two controlled modules comprises a shift register, and the signal wire comprises at least one of a clock signal line, a power signal line.

15. The display panel according to claim 14, wherein the display panel further comprises a first side and a second side which are disposed oppositely in a first direction, in the first preset sequence, among the at least two controlled modules, the drive signal first passes through one controlled module more adjacent to the first side and then is transmitted to an other controlled module, in the second preset sequence, among the at least two controlled modules, the drive signal does not pass through the one controlled module more adjacent to the first side but is transmitted to the other controlled module.

16. The display panel according to claim 14, further comprising a first side region and a second side region disposed on two sides of the at least two controlled modules respectively, wherein each of the first path wire section and the second path wire section is disposed in the first side region or the second side region.

17. The display panel according to claim 14, wherein the first path wire section and the second path wire section are disposed in a same layer or disposed in different layers.

18. The display panel according to claim 14, wherein the drive module comprises a drive integrated circuit.

19. The display panel according to claim 14, further comprising:

a bonding region, wherein the drive module is configured to provide the drive signal to the display panel through the bonding region.

20. The display panel according to claim 19, wherein the bonding region is provided with at least two pads, and the first end of the first path wire section and the first end of the second path wire section are connected to a same pad in the bonding region.

21. A display panel, comprising:

at least two controlled modules; and a signal wire connected to the at least two controlled modules, wherein the signal wire is configured to receive a drive signal sent by a drive module and transmit the drive signal to the at least two controlled modules, the signal wire comprises a first path wire section and a second path wire section, a first end of the first path wire section and a first end of the second path wire section are configured to receive a same drive signal, the first path wire section is configured to sequentially transmit the drive signal to the at least two controlled modules in a first preset sequence, the second path wire section is configured to sequentially transmit the drive signal to the at least two controlled modules in a second preset sequence, and the first preset sequence and the second preset sequence are different, a first side and a second side are disposed oppositely in a first direction, in the second preset sequence, among the at least two controlled modules, the drive signal does not pass through the one controlled module more adjacent to the first side but is transmitted to an other controlled module.

22. The display panel according to claim 21, wherein, in the first preset sequence, among the at least two controlled modules, the drive signal first passes through one controlled module more adjacent to the first side and then is transmitted to the other controlled module.

23. The display panel according to claim 22, wherein, in the second preset sequence, among the at least two controlled modules, one controlled module farther away from the first side receives the drive signal before the other controlled module.

24. The display panel according to claim 23, further comprising a first side region and a second side region disposed on two sides of the at least two controlled modules respectively, the first path wire section is disposed in the first side region, the second path wire section is disposed in the first side region or the second side region, and the second path wire section in the second side region extends from the first side toward the second side.

* * * * *